United States Patent  
ten Brink

(10) Patent No.: US 6,611,513 B1  
(45) Date of Patent: Aug. 26, 2003

(54) CDMA SYSTEM WITH ITERATIVE DEMAPPING OF A RECEIVED SIGNAL

(75) Inventor: Stephen ten Brink, Allmersbach im Tal (DE)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/375,645

(22) Filed: Aug. 17, 1999

(30) Foreign Application Priority Data

Aug. 21, 1998 (EP) .............................................. 98306720

(51) Int. Cl.⁷ .............................................. H04B 7/216
(52) U.S. Cl. ........................ 370/342; 370/320; 370/335; 370/441; 370/535; 370/537
(58) Field of Search ................................ 370/313, 320, 370/335, 342, 441, 535, 537

(56) References Cited

U.S. PATENT DOCUMENTS

| | | | |
|---|---|---|---|
| 5,555,268 A | | 9/1996 | Fattouche et al. ............ 375/206 |
| 6,072,770 A | * | 6/2000 | Ho et al. ...................... 370/209 |
| 6,072,785 A | * | 6/2000 | Ho ............................... 370/320 |
| 6,188,717 B1 | * | 2/2001 | Kaiser et al. ................. 375/148 |
| 6,278,701 B1 | * | 8/2001 | Ayyagari et al. ............. 370/310 |
| 6,359,938 B1 | * | 3/2002 | Keevill et al. ............... 370/206 |

FOREIGN PATENT DOCUMENTS

| | | | |
|---|---|---|---|
| DE | 197 17546 A1 | 4/1997 | ............ H04J/13/02 |
| EP | 0 818 901 A2 | 7/1997 | ............ H04J/13/00 |

OTHER PUBLICATIONS

European Search Report, dated Feb. 1, 1999.

\* cited by examiner

Primary Examiner—William Trost  
Assistant Examiner—Marcos Torres

(57) ABSTRACT

The invention concerns a CDMA system, including a transmitter and receiver, for use in e.g. a digital wireless communications system and in particular to a method of and apparatus for mapping and demapping CDMA signals. The CDMA system comprises a transmitter and a receiver. The transmitter includes an encoder and a bit interleaver for processing said CDMA signal to be transmitted, a mapper connected in series with the encoder and bit interleaver and means for transmitting said processed CDMA signal. The receiver comprises means for receiving said transmitted CDMA signal, a bit deinterleaver and a decoder for processing said received CDMA signal and a demapper connected in series with the bit deinterleaver and decoder. Iterative demapping may be performed in the receiver by passing back the output of the decoder to the demapper. A corresponding method is also disclosed.

16 Claims, 3 Drawing Sheets

CDMA SYSTEM WITH ITERATIVE DEMAPPING OF A RECEIVED SIGNAL

CROSS-REFERENCE TO RELATED APPLICATION

This application claims priority of European Patent Application No. 98306720.8, which was filed on Aug. 21, 1998.

BACKGROUND OF THE INVENTION

1. Field of the Invention

The invention relates to a CDMA system, including a transmitter and receiver, for use in e.g. a digital wireless communications system. In particular, the invention relates to a method of and apparatus for mapping and demapping CDMA signals.

2. Description of Related Art

Recently iterative decoding algorithms have become a vital field of research in digital communications. The first discovered and still most popular encoding scheme suited for iterative decoding is the parallel concatenation of two recursive systematic convolutional codes, also referred to as 'Turbo Codes', as described in J. Hagenauer, "The Turbo Principle: Tutorial Introduction and State of the Art", Symposium on Turbo Codes, Brest, France, September 1997. In the past few years other applications of the 'Turbo Principle' have been found e.g. G. Bauch, H. Khorram, J. Hagenauer, "Iterative Equalization and Decoding in Mobile Communications Systems", in Proc. EPMCC'97, Bonn, pp. 307–312, Germany, October 1997.

Channel coding is used to make the transmitted digital information signal more robust against noise. For this the information bit sequence is encoded at the transmitter by a channel encoder and decoded at the receiver by a channel decoder. In the encoder, redundant information is added to the information bit sequence in order to facilitate error correction in the decoder. For example, in a systematic channel encoding scheme the redundant information is added to the information bit sequence just as additionally inserted, 'coded' bits. In a non-systematic encoding scheme the outgoing bits are all coded bits, and no 'naked' information bits remain. The number of incoming bits (information bits) at the encoder is smaller than the number of outgoing bits (information bits plus inserted coded bits, or all coded bits). The ratio of incoming/outgoing bits is called the 'code rate R' (typically R=½).

Concatenated coding schemes apply to at least two parallels or serially concatenated encoders. There are iterative decoding algorithms for either parallel or serially concatenated coding systems and the classical 'Turbo' Codes are parallel concatenated codes.

FIG. 1 shows a genuine serially concatenated coding scheme with the transmission performed on a block-by-block basis. The signal sequence is encoded twice at the transmitter in a serial manner. The binary signal from the digital source (e.g. an analogue to digital converter with analogue input signal from a microphone) is first encoded by an outer encoder. The output of the outer encoder gets passed through an interleaver which changes the order of the incoming bit symbols to make the signal appear more random to the following processing stages. After the interleaver the signal is encoded a second time by an 'inner encoder'. Correspondingly, at the receiver the signal is first decoded by the inner decoder, deinterleaved, and decoded by the outer decoder. From the outer decoder soft values are fed back as additional 'a priori' input to the inner decoder. The soft values are reliability values of the quality of the decoded signal. The feedback of these values helps to reduce the bit error rate of the hard decision values 0,1 at the output of the outer decoder in further, iterative decoding steps. The iterative decoding of a particular transmitted sequence is stopped with an arbitrary termination criterion, e.g. after a fixed number of iterations, or until a certain bit error rate is reached (the termination criterion is not important at all for the invention). It should be noted that the 'a priori' soft value input to the inner decoder is set to zero for the very first decoding of the transmitted bit sequence ('0th iteration').

The inner and outer binary codes can be of any type: Systematic, or non-systematic, block or convolutional codes.

At the receiver the two decoders are soft-in/soft-out decoders (SISO decoder). A soft value represents the reliability of the bit decision of the respective bit symbol (whether 0 or 1). A soft-in decoder accepts soft reliability values for the incoming bit symbols. A soft-out decoder provides soft reliability output values on the outgoing bit symbols. The soft-out reliability values are usually more accurate than the soft-in reliability values since they can be improved during the decoding process based on the redundant information that is added with each encoding step at the transmitter.

Method and apparatus for iteratively demapping a signal is described in European Patent Application number 98302653.5 filed on Apr. 3, 1998, the contents of which are incorporated herein by reference.

CDMA (Code Division Multiple Access) systems have a plurality of users separated by different codes. Each transmitted bit of a user k is substituted by a number $N_c$ of 'shorter' bits, called 'chips', which are chosen according to the 'channelization code' of the particular user k. Since the occupied bandwidth expands by a factor of $N_c$ after the 'substitution', this process is called 'spreading', and a CDMA system is often referred to as 'spread spectrum system'. After spreading, the signal for each user occupies the total available bandwidth B. At the receiver the desired user is detected by means of correlation with the appropriate channelization code.

Multicode CDMA is a method that provides higher data rates to a single user in a CDMA system. The particular user is assigned N channelization codes, instead of having only one in a conventional CDMA system. Hence the 'multicode' user can transmit at an N times higher data rate than a 'single-code' user. The N binary antipodal codes are added up at the multicode transmitter to form a N+1-level amplitude modulated signal, instead of a binary antipodal signal for the single code case.

FIG. 2 shows a conventional multicode CDMA (M-CDMA) single user transmitter/receiver. The binary signal from the digital source (e.g. an analogue to digital converter with analogue input signal from a microphone) is first encoded by the channel encoder. The output of the channel encoder gets passed through an interleaver which changes the order of the incoming bit symbols to make the signal appear more random to the following processing stages. After the interleaver the coded bit stream is split into N parallel bit streams by a demux (serial to parallel conversion). Each bit stream 1, . . . ,N gets spread (i.e. multiplied) by a binary antipodal channelization code (codeword 1, . . . ,N) of length $N_c$ chips. Typically, the N channelization codes are orthogonal. After spreading the N binary antipodal chip streams are added up on the chip rate to form the amplitude modulated (N+1 levels) chip symbols. Hence N coded bit symbols result in $N_c$ chip symbols. Each block of $N_c$ chip symbols is referred to as a composite multicode CDMA symbol. Optionally, scrambling on the chip rate can be applied to even further randomize the signal. Typically the scrambling sequence is a binary antipodal pseudo-random sequence. The composite signal is then put to the transmission channel.

FIG. 2 shows base band processing only and up-conversion to radio frequency etc. is omitted for the sake of clarity. For simplicity of the description we assume a real signal processing. However, the real channelization codes could be complex channelization codes as well, or there could be a complex scrambling sequence.

On the channel the signal is distorted by additive noise, or any other noise form.

Correspondingly, at the receiver the signal is descrambled (optionally) and correlated with the N channelization codes (codewords 1, . . . ,N). The correlation consists of a multiplication with the respective channelization code and an accumulation over $N_c$ chips. After multiplexing (parallel to serial conversion) and deinterleaving the N correlation results are put to the channel decoder. Finally, the information bits are available at the output of the decoder, or the hard decision device respectively.

The conventional CDMA and M-CDMA system as described above does not allow for bit error rate (BER) reduction e.g. though iterative decoding. There is thus a requirement for a CDMA or M-CDMA system in which an improved BER may be achieved.

SUMMARY OF THE INVENTION

According to a first aspect of the invention there is provided a CDMA system comprising: a transmitter including an encoder and a bit interleaver for processing said CDMA signal to be transmitted; means for transmitting said processed CDMA signal; means for receiving said transmitted CDMA signal; a receiver including a bit deinterleaver and a decoder for processing said received CDMA signal; and characterized in that the transmitter includes a mapper connected in series with the encoder and bit interleaver and the receiver includes a demapper connected in series with the bit deinterleaver and decoder.

According to a second aspect of the invention there is provided a CDMA transmitter comprising: an encoder and a bit interleaver for processing said CDMA signal to be transmitted; means for transmitting said processed CDMA signal; characterized in that the transmitter includes a mapper connected in series with the encoder and bit interleaver.

According to a third aspect of the invention there is provided a CDMA receiver comprising: means for receiving said transmitted CDMA signal; a bit deinterleaver and a decoder for processing said received CDMA signal; and characterized in that the receiver includes a demapper connected in series with the bit deinterleaver and decoder.

In the receiver iterative demapping is performed by passing back the output of the decoder to the demapper. The system may be a multi-user CDMA system, in which case the N parallel channelization codes are regarded as the channelization codes of at most N different users. The system may be a multicode CDMA system in which case the N channelization codes belong to at least one user.

According to a fourth aspect of the invention there is provided a method of transmitting a CDMA signal comprising the steps of: generating a CDMA signal to be transmitted; encoding and bit interleaving said CDMA signal; transmitting said encoded and interleaved CDMA signal; and characterized in that the encoded and interleaved CDMA signal is mapped before being transmitted.

There is also provided a method of receiving a CDMA signal transmitted as described above comprising receiving the transmitted CDMA signal; bit deinterleaving and decoding the received CDMA signal; and characterized in that the received CDMA signal is demapped before being deinterleaved and decoded.

The CDMA signal is iteratively demapped by iterating the bit deinterleaving, decoding and demapping steps.

By inserting a mapper between demultiplexer and orthogonal spreading of the N parallel CDMA channels of a conventional transmitter, a bit error, rate reduction through iterative decoding can be achieved at the receiver. For this, the receiver has to perform a demapping operation after the despreading. The demapper can make use of a priori knowledge gained by the channel decoder that enables iterative demapping and decoding.

The 'modified' mapping can be arbitrary and just needs to be different from the 'identical' mapping. However, the achievable performance gains strongly depend on the chosen 'modified' mapping. The mapper does not add redundancy to the signal and can be interpreted as a rate one binary block encoder in combination with orthogonal CDMA spreading. However, the spreading does not have to be orthogonal.

Iterative demapping and decoding reduces the bit error rate of multicode CDMA links that use plain channel coding.

Iterative demapping and decoding for CDMA works as long as there is at least one bit symbol interleaver between encoder and the spreading/mapping.

Since the orthogonality of the spreading codes is preserved, this method is suited, e.g., for synchronous multi-user down-link communication in a wireless communication link (base station to mobile terminal, multi-user transmitter), as well as for asynchronous up-link communication (mobile terminal to base station, single user transmitter).

BRIEF DESCRIPTION OF THE DRAWINGS

An embodiment of the invention is described below and with reference to the following figures in which.

DETAILED DESCRIPTION

Figure 1:
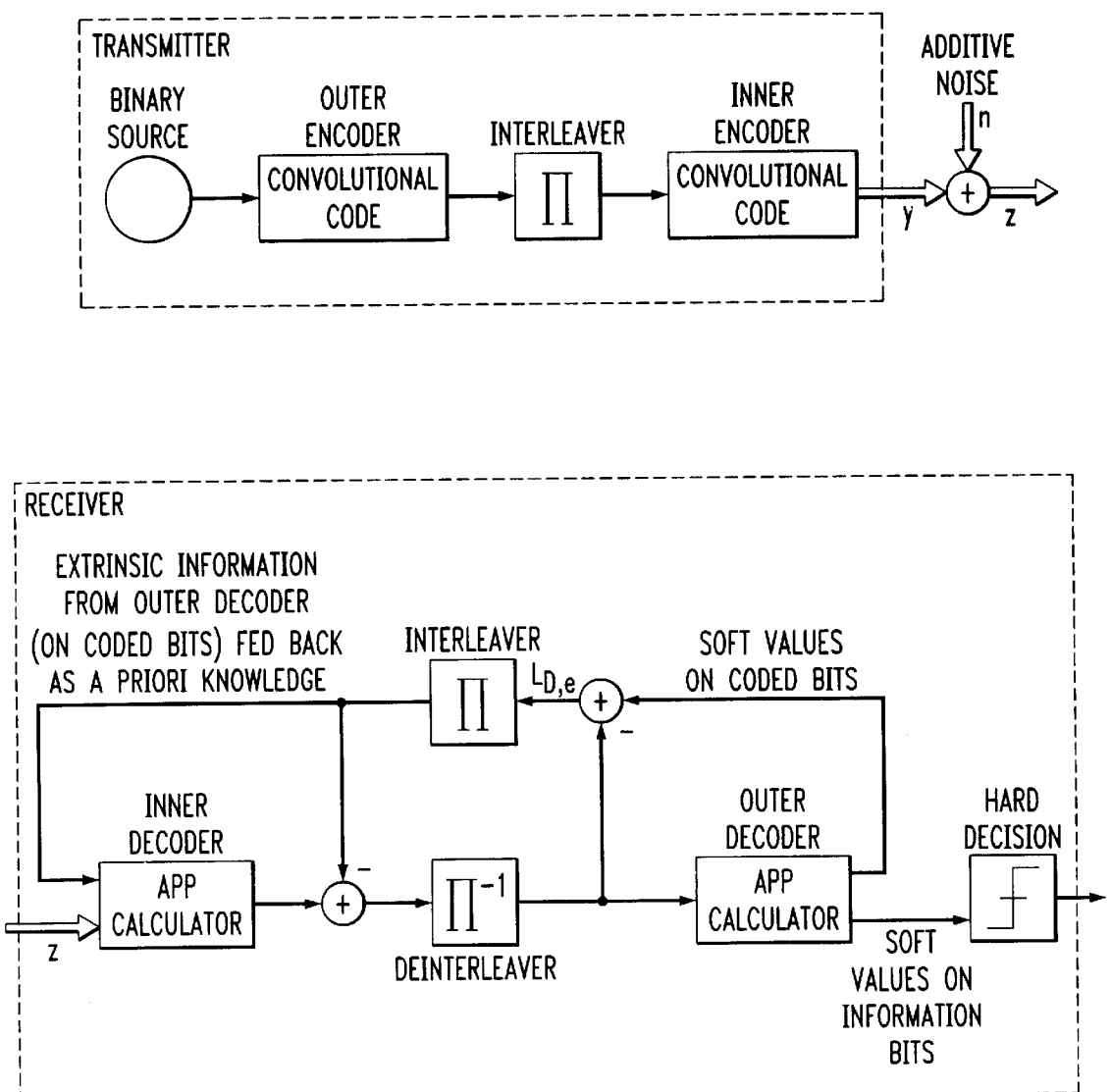
FIG. 1 shows a transmitter and receiver using a serially concatenated coding scheme.
Figure 2:
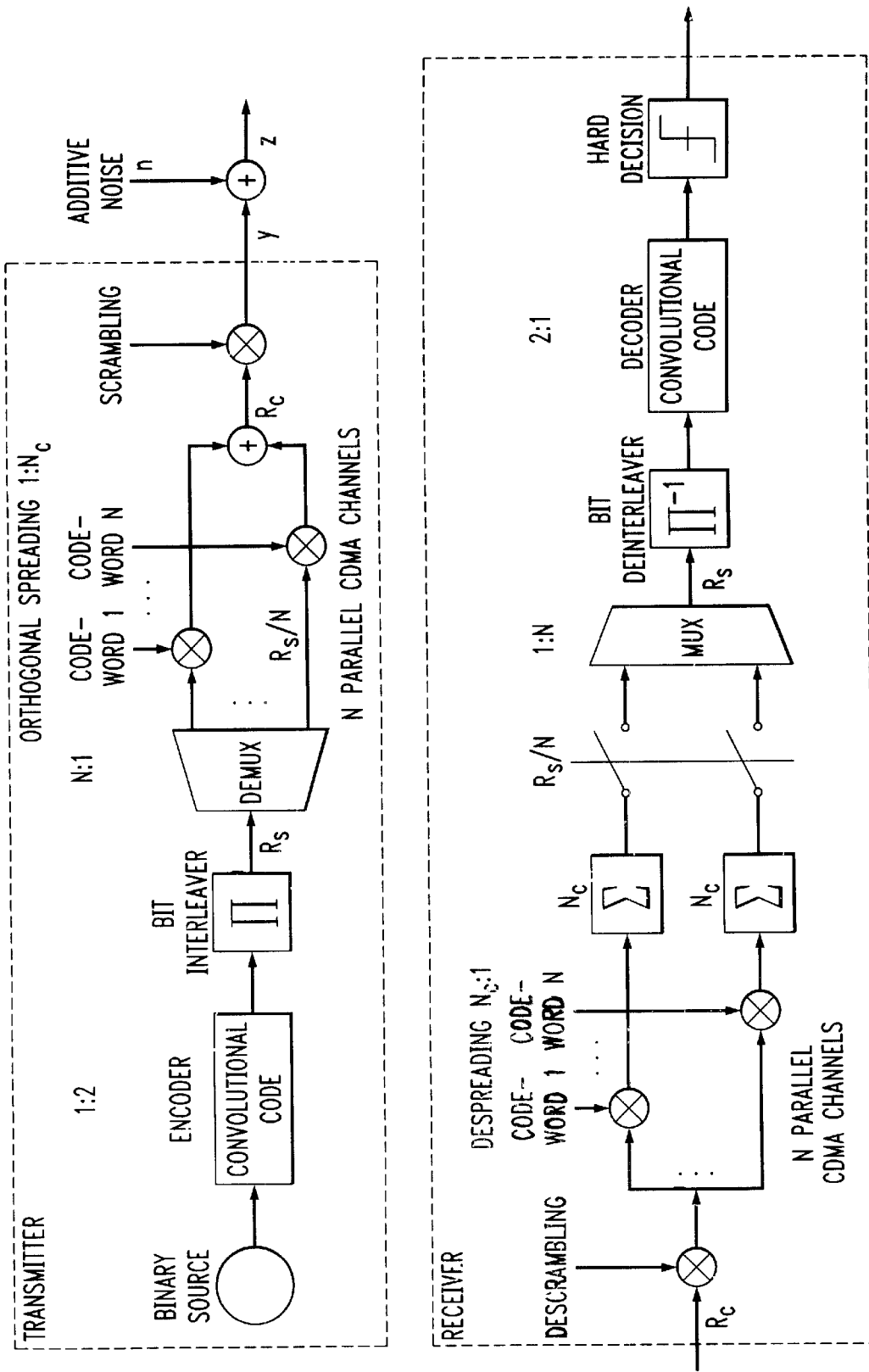
FIG. 2 shows a conventional multicode CDMA (M-CDMA) single user transmitter and receiver.
Figure 3:
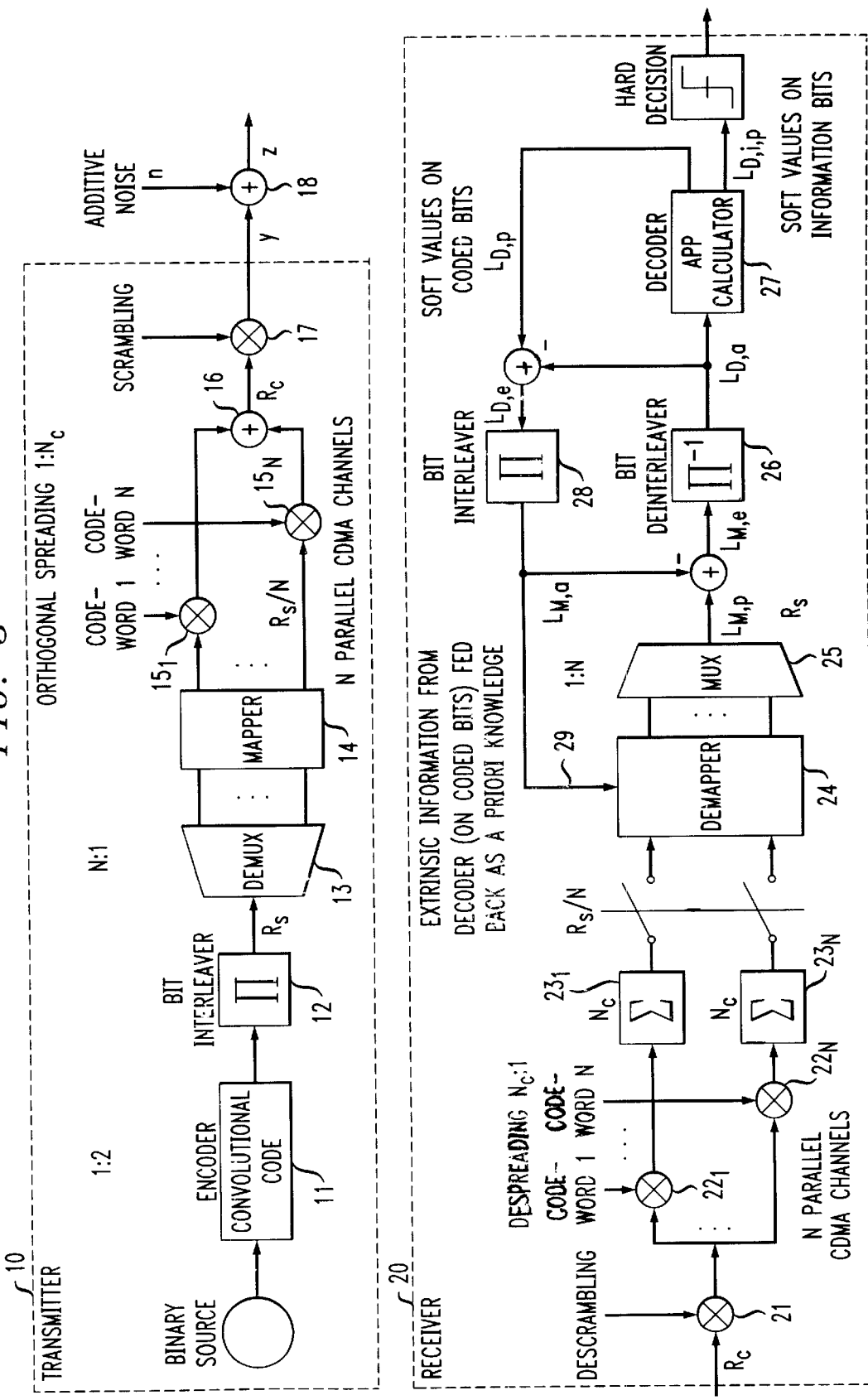
FIG. 3 shows a multicode CDMA (M-CDMA) single user, transmitter and receiver according to the invention.

At the transmitter 10 of FIG. 3, the binary random signal gets convolutionally encoded 11 and fed to a random bit interleaver 12 which interleaves the bit symbols (any channel code can be used and any code rate, not only convolutional codes). After the interleaver the coded bit stream is split into N parallel bit streams by a demux 13 which performs serial to parallel conversion.

The mapper 14 performs a N bit to N bit mapping operation. After mapping, each bit stream 1, . . . ,N gets spread (i.e. multiplied by multipliers $15_1$ to $15_N$) by a binary antipodal channelization code (codeword 1, . . . ,N) of length $N_c$, chips. Typically, the N channelization codes are orthogonal. After spreading the codewords are added up by adder 16 on the chip-rate. Optionally a binary antipodal scrambling sequence can be applied (17) to even further randomize the signal.

On the channel, the symbols are distorted by additive noise (illustrated by adder 18), or any other noise forms.

At the receiver 20 the signal gets descrambled 21 (optional) and correlated with the N channelization codes (codewords 1, . . . ,N). The correlation consists of a multiplication by multipliers $22_1$ to $22_N$ with the respective channelization code and an accumulation over $N_c$, chips at accumulators $23_1$ to $23_N$. The N correlation results are utilized by the demapper 24 to calculate log-likelihood ratios (also referred to as L-values) of the transmitted coded bits $x_{0, \ldots, n-1}$ of the N multicode CDMA channels.

The log-likelihood ratio values are multiplexed at multiplexer 25, deinterleaved by bit deinterleaver 26 and put to the A Posteriori Probability calculator 27 (APP), or any other SISO-decoder. After the decoding the estimates on the transmitted information bits are available at the output of the hard decision device by taking the sign of the APP-soft output values for the information bits.

In the iterative demapping/decoding path the 'extrinsic information' is passed through the bit interleaver 28 and fed back as a priori knowledge to the demapping device 24 at input 29. The 'extrinsic' information is the difference of the soft input/soft output values at the decoder and depicts the new, statistically independent information (at least for the first iteration) gained by the decoding process. The demapping device can utilize the a priori knowledge from the decoder to refine its output for further iterative decoding steps.

Note that the iterative decoding is performed on the bit-rate rather than the chip-rate, and thus it is of low complexity.

For simplicity, the following description, assumes real signal processing, a single propagation path, and additive noise. The extension to complex signal processing, multipath propagation and other noise forms is straightforward. The signal processing for one particular composite multicode CDMA symbol z (vector with $N_c$ elements) is considered.

Note: boldface denotes vectors.

At the transmitter:

The N:N-mapper performs a mapping of N coded bits (vector x) to the mapped coded bit vector $x_M$=map(x), $x=(x_o, \ldots, x_{N-1})$, $$x_M=(x_{M,0}, \ldots, x_{M,N-1}); x_i, x_{M,i} \in \{-1,+1\}$$

The bit vectors x, $x_M$ are interpreted as integer numbers with values ranging from 0 to $2^N - 1$ and calculated, e.g. for x as $$\sum_{i=0}^{N-1} \frac{(x_i + 1)}{2} \cdot 2^i$$

(for $x_M$ respectively), then an arbitrary mapping for N=3 might be defined by:

| input x | mapped output $x_M$ |
| --- | --- |
| 0 | 5 |
| 1 | 2 |
| 2 | 7 |
| 3 | 1 |
| 4 | 0 |
| 5 | 6 |
| 6 | 3 |
| 7 | 4 |

After mapping, an orthogonal spreading with Walsh-code matrix $W=(w_0, \ldots, w_{N-1})$ and scrambling with sequence s is performed. The transmitted signal is $$y=(x_M \cdot W) \circ s$$

In which:

row-vectors $w_i$, i=0 . . . N−1 denote the use of Walsh-vectors of length $N_c$ chips;

as usual, the 'circle-multiplication' denotes component-wise multiplication of two vectors;

s is the scrambling sequence vector;

The received additive noise-affected composite multicode CDMA symbol at the output of the channel is:

$$z=(x_M \cdot W) \circ s + n$$

with noise vector n

At the receiver:

For each coded bit $x_0, \ldots, x_{N-1}$, that is transmitted within the composite multicode CDMA symbol z the demapper calculates the log-likelihood ratio (L-value) of the respective bit conditioned on z. The absolute value of the L-value denotes the reliability of the bit decision. E.g., for bit $x_k$ the demapper soft output is the L-value $$L(x_k | z) = L_a(x_k) + \ln \frac{\sum_{i=0}^{2^{N-1}-1} p(z | x_k = 1, x_{j,j=0 \ldots N-1, j \neq k} \equiv bin(i)) \cdot \exp \sum_{\substack{j=0, j \neq k \\ btst(i,j)=1}}^{N-1} L_a(x_j)}{\sum_{i=0}^{2^{N-1}-1} p(z | x_k = 0, x_{j,j=0 \ldots N-1, j \neq k} \equiv bin(i)) \cdot \exp \sum_{\substack{j=0, j \neq k \\ btst(i,j)=1}}^{N-1} L_a(x_j)}$$

where $x_{j,j=0 \ldots N-1, j \neq k} \equiv bin(i)$ denotes the joint event of the variables $x_{j,j=0 \ldots N-1, j \neq k}$ taking on values 0, 1 according to the binary decomposition of i. E.g., for N=4, k=1, i=5 we have $x_3=1$, $x_2=0$ and $x_0=1$. The function btst(i,j) takes on the value '1' if bit number j is set in the binary decomposition of i, otherwise it is '0', with $$\tilde{j} = \begin{cases} j, & j < k \\ j-1, & j \geq k \end{cases}$$

For the real additive white Gaussian noise channel $$\tilde{p}(z|\hat{x}) = \exp\left[\frac{1}{\sigma^2} \cdot \hat{x}_M \cdot corr\right]$$

whereby $$corr = (z \circ s) \cdot W^T = x_M \cdot W \cdot W^T + (n \circ s) \cdot W^T = N_c \cdot x_M + \tilde{n}$$

denotes the vector of N correlation results at the receiver that are inputted to the demapper.

Note: $\hat{x}_M = map(\hat{x})$ is the hypothesized received mapped coded bit vector of the considered multicode CDMA symbol, and $x_M = map(x)$ the actually transmitted one.

Further notations:

$\sigma^2$ is the power of the additive noise on the channel.

'ln' denotes the natural logarithm, 'exp' the exponential function.

The a priori L-value for, e.g., unmapped coded bit $x_k$ is $$L_a(x_k) = \ln\frac{P[x_k = 1]}{p[x_k = 0]}.$$

Note that the 'a priori' L-values of bits $x = (x_0, \ldots, x_{N-1})$ are provided by the SISO-decoder as inputs to the soft demapping device after the first decoding pass. For the very first decoding pass these values are set to zero.

After the subtraction of $L_a(x_k)$ (see FIG. 3) only the so called 'extrinsic information' of the demapper is passed on to the deinterleaver and channel SISO decoder.

The extension to complex signal processing (I-/Q-channel) is straightforward. The channelization codes do not need to be orthogonal.

Furthermore, the application in a multipath channel environment (typical for wireless communication channels) will be immediately apparent to one skilled in the art. A rake receiver is applied in order to compensate for multipath propagation. A rake receiver for coherent detection consists of a number of 'finger-correlators' (ideally, one finger per multipath component). The outputs of finger-correlators are then combined in a 'maximum ratio combiner.' The demapping is then performed after the maximum ratio combiner, working on the 'combined' correlation results.

The number of N parallel CDMA channels in the multicode CDMA signal, or mulituser CDMA signal respectively, does not have to be equal to the number of bits on which the mapping is performed. Moreover, the number of mapped bits could be both smaller or bigger than N. The appropriate changes in the mathematical description and figures would be immediately apparent to one skilled in the art.

What is claimed is:

1. A CDMA system comprising:
   a transmitter including an encoder and a bit interleaver for processing said CDMA signal to be transmitted;
   means for transmitting said processed CDMA signal;
   means for receiving said transmitted CDMA signal;
   a receiver including a bit deinterleaver and a decoder for processing said received CDMA signal; and
   said transmitter includes a mapper connected in series with the encoder and bit interleaver and the receiver includes a demapper connected in series with the bit deinterleaver and decoder;
   wherein the receiver performs iterative demapping by passing back the output of the decoder to the demapper.

2. A system as claimed in claim 1 wherein the system is a multi-user CDMA system.

3. A system as claimed in claim 2 wherein the transmitter includes a demultiplexer in series with the mapper.

4. A system as claimed in claim 2 wherein the receiver includes a multiplexer in series with the demapper.

5. A system as claimed in claim 1 wherein said system is a multicode CDMA system.

6. A CDMA transmitter comprising:
   an encoder and a bit interleaver for processing said CDMA signal to be transmitted;
   means for transmitting said processed CDMA signal; and
   said transmitter includes a mapper connected in series with the encoder and bit interleaver;
   wherein the transmitted signal is configured for processing in a receiver having a demapper connected in series with a bit deinterleaver and a decoder, the receiver performing iterative demapping by passing back the output of the decoder to the demapper.

7. A transmitter as claimed in claim 6 wherein said transmitter is a multi-user CDMA transmitter.

8. A transmitter as claimed in claim 7 wherein said transmitter includes a demultiplexer in series with the mapper.

9. A CDMA receiver comprising:
   means for receiving said transmitted CDMA signal;
   a bit deinterleaver and a decoder for processing said received CDMA signal; and
   said receiver includes a demapper connected in series with the bit deinterleaver and decoder;
   wherein said receiver performs iterative demapping by passing back the output of the decoder to the demapper.

10. A receiver as claimed in claim 9 wherein said receiver is a multi-user CDMA receiver.

11. A receiver as claimed in claim 10 wherein said receiver includes a multiplexer in series with the demapper.

12. A method of transmitting a CDMA signal comprising the steps of:
    generating a CDMA signal to be transmitted;
    encoding and bit interleaving said CDMA signal; and
    transmitting said encoded and interleaved CDMA signal, wherein
    the encoded and interleaved CDMA signal is mapped before being transmitted; and
    wherein the transmitted signal is configured for processing in a receiver having a demapper connected in series with a bit deinterleaver and a decoder, the receiver performing iterative demapping by passing back the output of the decoder to the demapper.

13. A method of receiving a CDMA signal transmitted according to claim 12 comprising:
    receiving the transmitted CDMA signal; and
    bit deinterleaving and decoding the received CDMA signal, wherein
    the received CDMA signal is demapped before being deinterleaved and decoded.

14. A method as claimed in claim 13 wherein the CDMA signal is iteratively demapped by iterating the bit deinterleaving, decoding and demapping steps.

15. A method as claimed in claim 12 wherein the CDMA signal is a multi-user CDMA signal.

16. A method as claimed in claim 12 wherein the CDMA signal is a multicode CDMA signal.

* * * * *